US006568470B2

(12) United States Patent
Goodson, Jr. et al.

(10) Patent No.: US 6,568,470 B2
(45) Date of Patent: May 27, 2003

(54) DOWNHOLE ACTUATION SYSTEM UTILIZING ELECTROACTIVE FLUIDS

(75) Inventors: James Edward Goodson, Jr., Porter, TX (US); Michael Carmody, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 3 days.

(21) Appl. No.: 09/916,617

(22) Filed: Jul. 27, 2001

(65) Prior Publication Data

US 2003/0019622 A1 Jan. 30, 2003

(51) Int. Cl.[7] ......................... E21B 23/00; E21B 23/04; E21B 34/14; F16K 31/02

(52) U.S. Cl. ..................... 166/66.5; 166/66.6; 166/122; 166/334.1; 137/909; 251/129.01

(58) Field of Search ............................... 166/66.5, 66.6, 166/66.7, 120, 122, 135, 332.8, 334.1; 137/909; 251/129.01

(56) References Cited

U.S. PATENT DOCUMENTS

| | | | | | |
|---|---|---|---|---|---|
| 2,417,850 | A | | 3/1947 | Winslow | 175/320 |
| 2,575,360 | A | | 11/1951 | Rabinow | 192/21.5 |
| 4,992,360 | A | | 2/1991 | Tsuruta et al. | 430/556 |
| 5,158,109 | A | * | 10/1992 | Hare, Sr. | 137/514.3 |
| 5,167,850 | A | | 12/1992 | Shtarkman | 252/62.52 |
| 5,277,282 | A | | 1/1994 | Umemura | 188/290 |
| 5,284,330 | A | | 2/1994 | Carlson et al. | 267/140.14 |
| 5,404,956 | A | * | 4/1995 | Bohlen et al. | 166/120 |
| 5,452,745 | A | * | 9/1995 | Kordonsky et al. | 137/807 |
| 6,158,470 | A | * | 12/2000 | Ivers et al. | 137/807 |
| 6,257,356 | B1 | * | 7/2001 | Wassell | 166/66.5 |
| 2002/0108747 | A1 | * | 8/2002 | Dietz et al. | 166/66.7 |

FOREIGN PATENT DOCUMENTS

| | | |
|---|---|---|
| EP | 0 581 476 | 2/1994 |
| GB | 2352464 | 1/2001 |
| WO | WO 99/22383 | 5/1999 |

OTHER PUBLICATIONS

"Commercial Magneto–Rheological Fluid Devices", Authors: J. D. Carlson, D. M. Catanzarite and K. A. St. Clair; 5$^{th}$ Int. Conf. On Electro–Reheolgical, Magneto–Rheoogical Suspensions and Associated Technology, Sheffield, Jul. 10–14, 1995.

"Properties and Applications of Commerical Magnetorheological Fluids", Authors: Mark R. Jolly, Jonathan W. Bender and J. David Carlson, SPIE 5$^{th}$ Annual Symposium Int. on Smart Structures and Materials, San Diego, CA, Mar. 15, 1998.

Engineering Note, Designing with MR Fluids, Lord Corporation, Thomas Lord Research Center, 05/98.

* cited by examiner

*Primary Examiner*—Heather Shackelford
*Assistant Examiner*—Brian Halford
(74) *Attorney, Agent, or Firm*—Madan, Mossman & Sriram, P.C.

(57) ABSTRACT

Downhole wellbore tools are actuated by electrically controllable fluids that are energized by a magnetic field. When energized, the viscosity state of the fluid may be increased by a degree depending on the fluid formulation. Reduction of the controllable fluid viscosity by terminating a magnetic field acting upon the fluid may permit in situ wellbore pressure to displace a tool actuating piston. When the field is de-energized, the controllable fluid viscosity quickly falls thereby permitting the fluid to flow through an open orifice into a low pressure receiving volume. In an alternative embodiment of the invention, an expandable volume fluid may be used against a slip actuating element in the same manner as a fluid pressure motor.

10 Claims, 3 Drawing Sheets

DOWNHOLE ACTUATION SYSTEM UTILIZING ELECTROACTIVE FLUIDS

BACKGROUND OF THE INVENTION

1. Field of the Invention

The present invention relates to the art of earth boring. In particular, the invention relates to methods and apparatus for remotely controlling the operation of downhole tools.

2. Description of Related Art

In pursuit of deeply deposited economic minerals and fluids such as hydrocarbons, the art of earthboring involves many physical operations that are carried out remotely under hazardous and sometimes hostile conditions. For example, hydrocarbon producing boreholes may be more than 25,000 ft. deep and have a bottom-hole pressure more than 10,000 psi and a bottom-hole temperature in excess of 300 F.

Transmitting power and control signals to dynamic tools working near the wellbore bottom is an engineering challenge. Some tools and circumstances allow the internal flow bore of a pipe or tubing string to be pressurized with water or other well working fluid. Sustained high pressure may be used to displace sleeves or piston elements within the work string. In other circumstances, a pumped circulation flow of working fluid along the pipe bore may be used to drive a downhole fluid motor or electric generator.

The transmission of operational commands to downhole machinery by coded sequences of pressure pulses carried along the wellbore fluid has been used to signal the beginning or ending of an operation that is mechanically executed by battery power such as the opening or closing of a valve. Also known to the prior art is the technique of using in situ wellbore pressure to power the operation of a mechanical element such a a well packer or slip.

All of these prior art power and signal devices are useful in particular environments and applications. However, the challenges of deepwell drilling are many and diverse. New tools, procedures and downhole conditions evolve rapidly. Consequently, practitioners of the art constantly search for new and better devices and procedures to power or activate a downhole mechanism.

"Controllable fluids" are materials that respond to an applied electric or magnetic field with a change in their rheological behavior. Typically, this change is manifested when the fluids are sheared by the development of a yield stress that is more or less proportional to the magnitude of the applied field. These materials are commonly referred to as electrorheological (ER) or magnetorheological (MR) fluids. Interest in controllable fluids derives from their ability to provide simple, quiet, rapid-response interfaces between electronic controls and mechanical systems. Controllable fluids have the potential to radically change the way electromechanical devices are designed and operated.

MR fluids are non-colloidal suspensions of polarizable particles having a size on the order of a few microns. Typical carrier fluids for magnetically responsive particles include hydrocarbon oil, silicon oil and water. The particulates in the carrier fluid may represent 25–45% of the total mixture volume. Such fluids respond to an applied magnetic field with a change in rheological behavior. Polarization induced in the suspended particles by application of an external field causes the particles to form columnar structures parallel to the applied field. These chain-like structures restrict the motion of the fluid, thereby increasing the viscous characteristics of the suspension.

ER systems also are non-colloidal suspensions of polarizable particles having a size on the order of a few microns. However, with applied power, some of these fluids have a volume expansion of 100%. Some formulations, properties and characteristics of controllable fluids have been provided by the authors Mark R. Jolly, Jonathan W. Bender and J. David Carlson in their publication titled *Properties and Application of Commercial Magnetorheological Fluids*, SPIE 5$^{th}$ Annual Int. Symposium on Smart Structures and Materials, San Diego, Calif., March, 1998, the body of which is incorporated herein by reference.

It is, therefore, an object of the present invention to provide a new downhole operational tool in the form of electrically responsive polymers as active tool operation and control elements.

Also an object of the present invention is the provision of a downhole well tool having no moving fluid control elements.

Another object of the present invention is a disappearing flow bore plug that is electrically ejected from a flow obstruction position.

SUMMARY OF THE INVENTION

The present invention provides a method and apparatus for actuation of a downhole tool by placing an electroactive fluid in a container within the tool where the fluid becomes either highly viscous or a solid when a small magnetic field is applied. After deactivation or removal of an electromagnetic field current, the fluid becomes much less viscous. At the lower viscosity value, the fluid may be induced to flow from a mechanical restraint chamber thereby permitting the movement of a slip setting piston. Such movement of a setting piston may be biased by a mechanical spring, by in situ wellbore pressure or by pump generated hydraulic pressure, for example.

In another application that is similar to the first, an ER polymer is positioned to expand against setting piston elements when an electromagnetic field is imposed. The polymer expansion may be applied to displace cooperating wedge elements, for example.

In yet another application, an MR fluid may be used to control a failsafe lock system wherein a fluid lock keeps a valve blocking element open against a mechanical spring bias until an electromagnetic power current is removed. When the current is removed and the magnetic field decreases, the MR fluid is expressed from a retention chamber under the bias of the spring to allow closure of the valve blocking element.

Under some operational circumstances, it is necessary to temporarily but completely block the flow bore of a production tube by such means as are characterized as a "disappearing" plug. Distinctively, when the disappearing plug is removed to open the tubing flow bore, little or no structure remains in the flow bore to impede fluid flow therein. To this need, the invention provides a bore plug in the form of a thin metal or plastic container in the shape of a short cylinder, for example, filled with MR fluid. The MR fluid filled cylinder may be caged across the tubing flow bore in a retainer channel. An electromagnet coil is positioned in the proximity of the retainer channel. At the appropriate time, the coil is de-energized to reduce the MR fluid viscosity thereby collapsing from the retainer channel and from a blocking position in the tubing bore.

An ER fluid may be used as a downhole motor or linear positioning device. Also, an ER fluid may be used as a direct wellbore packing fluid confined within a packer sleeve and electrically actuated to expand to a fluid sealing annulus barrier.

BRIEF DESCRIPTION OF THE DRAWINGS

For a thorough understanding of the present invention, reference is made to the following detailed description of the preferred embodiments, taken in conjunction with the accompanying drawing wherein.

DESCRIPTION OF THE PREFERRED EMBODIMENTS

Figure 1:
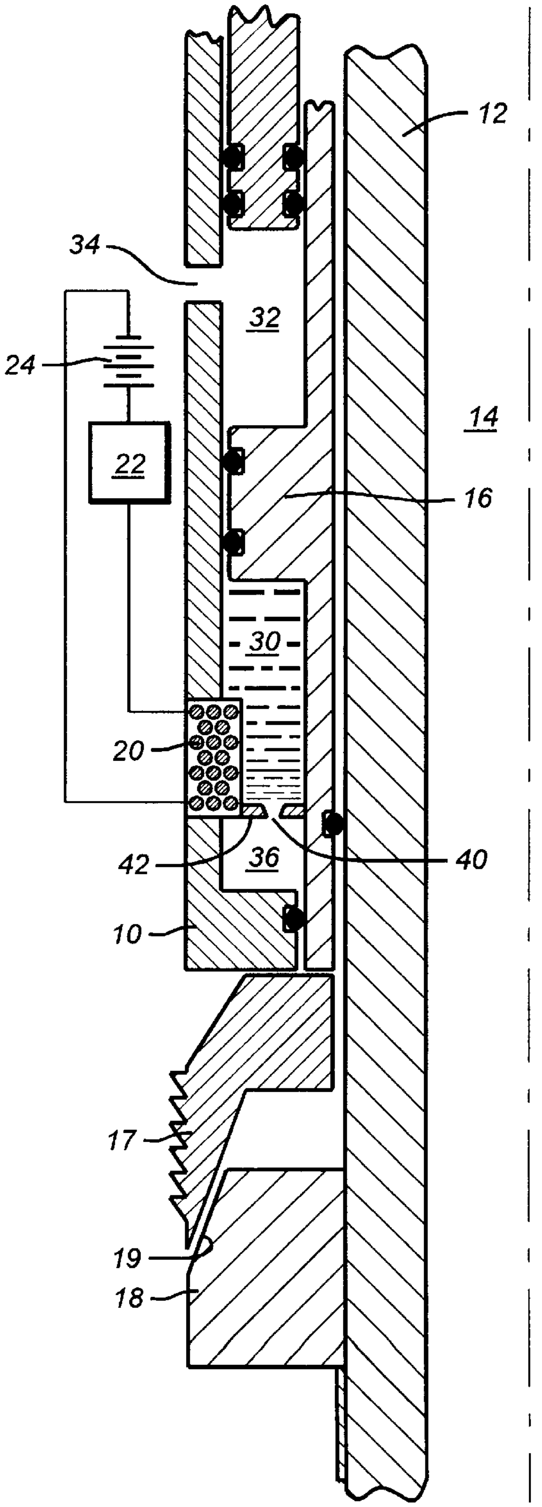
FIG. 1 illustrates a longitudinal half-section of a well tool actuation piston in which an MR fluid functions as a valve to release the actuating piston of a pipe slip for displacement under the drive force of in situ wellbore pressure.

Referring to FIG. 1, the slip actuating section of a downhole tool is illustrated in schematic quarter section. Typically, the tool is assembled within a casement or housing pipe 10. Concentrically within the casement is an internal mandrel 12 around a central fluid flow bore 14. Slip wickers 17 are distributed around the mandrel circumference to overlie the ramped face 19 of an actuating cone 18. The cone 18 is secured to the mandrel 12. The slip wickers 17 are translated axially along the mandrel by the ram edge of a piston 16. As the piston 16 advances axially along the mandrel surface against the wickers 17, the wickers slide along the face of ramp 19 for a radially outward advancement against a well bore wall or casing.

One face of the piston 16 is a load bearing wall of a wellbore pressure chamber 32. One or more flow ports 34 through the casement wall 10 keep the chamber 32 in approximate pressure equilibrium with the wellbore fluid pressure. The opposing face of piston 16 is a load bearing wall of the electrically controlled fluid chamber 30. An orifice restrictor 42 is another load bearing wall of the controlled fluid chamber 30 and is designed to provide a precisely dimensioned orifice passageway 40 between the restrictor and the piston 16 sleeve.

Constructed into the outer perimeter of the casement 10 adjacent to the controlled fluid chamber 30 is an electromagnet winding 20. Typically, the winding is energized by a battery 24 carried within the tool, usually near an axial end of the tool. A current controller 22 in the electromagnet power circuit comprises, for example, a signal sensor and a power switching circuit. The signal sensor may, for example, be responsive to a coded pulse sequence of pressure pulsations transmitted by well fluid as a carrier medium.

Opposite of the orifice 40 and restrictor 42 is a low pressure chamber 36. Frequently, the low pressure chamber is a void volume having capacity for the desired quantity of controlled fluid as is expected to be displaced from the chamber 30. Often, the tool is deployed with ambient pressure in the chamber 36, there being no effort given to actively evacuate the chamber 36. However, downhole presure may be many thousands of pounds per square inch. Consequently, relative to the downhole pressure, surface ambient pressure is extremely low.

As the tool is run into a well, the winding 20 is energized to polarize the controllable fluid in the chamber 30 and prevent bypass flow into across the restriction 40 into the low pressure chamber 36. When situated at the desired depth, the coil is de-energized thereby permitting the controllable fluid to revert to a lower viscosity property. Under the in situ pressure bias in chamber 32, the slip actuating piston 16 displaces the controllable fluid from the chamber 30 into the low pressure chamber 36. In the process, the actuating piston 16 drives the slip wicker 17 against the conical face 19 of the actuating cone 18 thereby forcing the slip wicker radially outward against the surrounding case wall.

Figure 2:
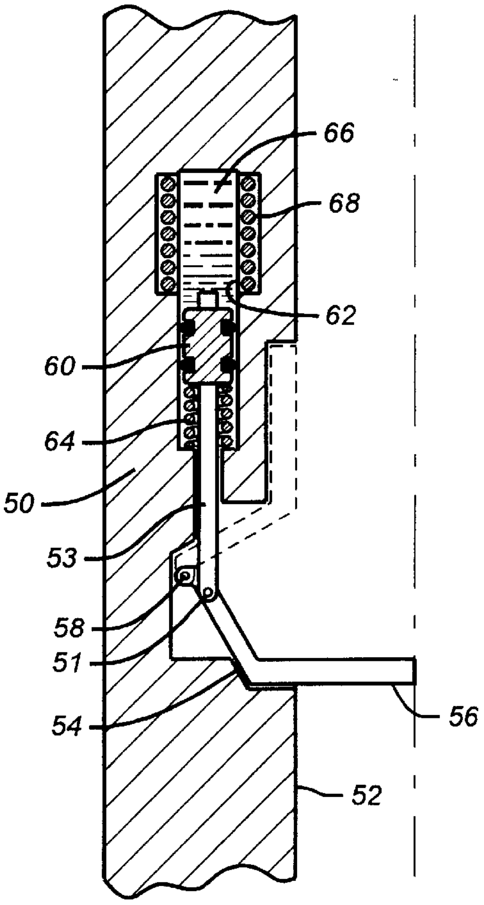
FIG. 2 illustrates a longitudinal half-section of a remotely actuated flapper valve.

With respect to the FIG. 2 embodiment of the invention, a selectively controlled flapper valve is represented. The valve body 50 surrounds a fluid flow bore 52 with a closure seat 54. A flapper element 56 is pivotably secured to the housing 50 by a hinge joint 58. Rotation of the flapper element arcs about the hinge 58 from an open flow position shown in dashed line to the flow blocking position shown in solid line as contacting the closure seat 54.

Also pivotally connected to the flapper element at the hinge joint 51 is piston rod 53 extended from a piston element 60. The piston translates within a chamber 62. On the rod side of the chamber space is a coil spring 64 that biases the piston away from the hinge axes and toward the head end 66 of the chamber space. The head end 66 of the chamber 62 is charged with controllable fluid and surrounded by an electromagnet coil 68. The piston may or mat not be perforated between the head face and rod face by selectively sized orifices that will permit the controllable fluid to flow from the head chamber 66 into the rod chamber under the displacement pressure bias of the spring 64 when the coil is de-energized. As shown with the rod hinge 51 on the inside of the flapper hinge 58, advancement of the piston 60 into the head chamber 66 will rotate the flapper 56 away from the closure seat 54 to open the flow bore 52. The opposite effect may be obtained by placing the rod hinge 51 on the outside of the flapper hinge 58.

Figure 3:
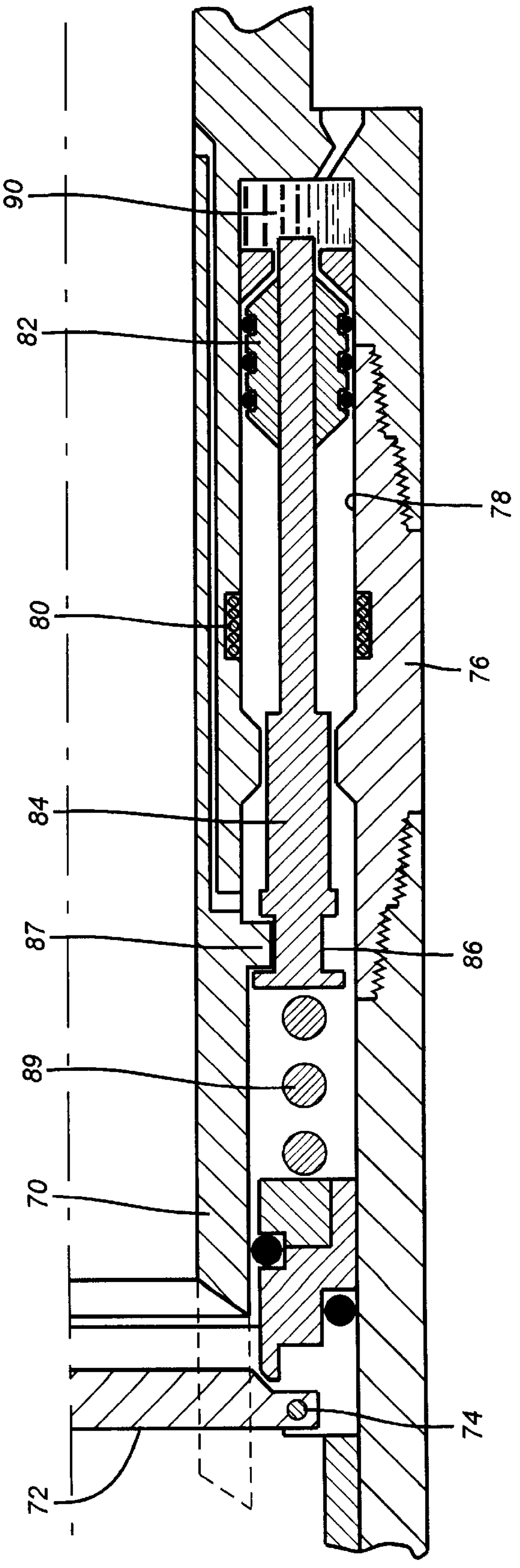
FIG. 3 illustrates a longitudinal half-section of a check valve or safety valve that is locked at an open position by a controllable fluid.

FIG. 3 represents another valve embodiment of the invention wherein an axially sliding sleeve element 70 is translated to a position that blocks the rotation of valve flapper 72 about the hinge axis 74 as shown by the dashed line position of the sleeve 70. In this case, the valve body 76 includes a fluid pressure chamber 78 ringed by a magnet winding 80. A piston 82 and integral rod 84 translates within the chamber 78. The distal end of the rod 84 is channeled 86 to mesh with an operating tab 87 projecting from the locking sleeve 70. A coil spring 89 bears against the distal end of the rod 84 to bias the sleeve 70 to the un-lock position. Opposing the bias of spring 89 is the force resultant of pressurized controllable fluid in the head chamber 90. After a pumped influx of controllable fluid into the head chamber 90 drives the piston 82 and rod 84 to the rod end of the chamber 78 against the bias of spring 89, the coil 80 is energized to hold the position by substantially solidifying the ER fluid within the head chamber 90. Resultantly, the controllable fluid pressure in the head chamber 90 may be relaxed while simultaneously holding the locking sleeve 70 in the position of blocking the rotation of flapper 72.

Figure 4:
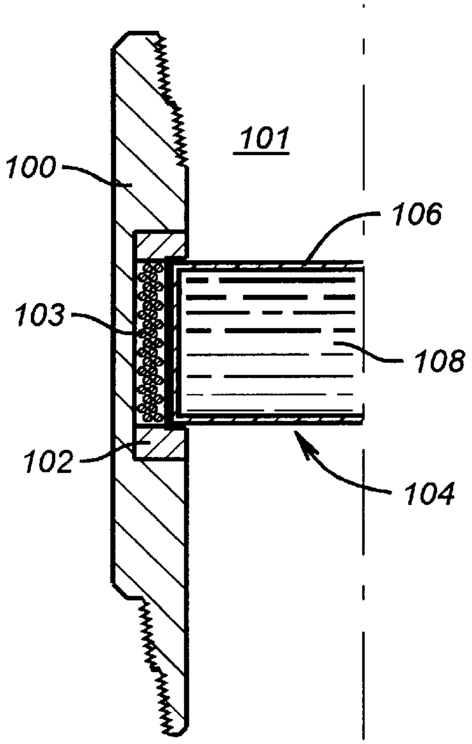
FIG. 4 illustrates a longitudinal half-section of a controllable fluid filled bore plug; and, FIG. 5 schematically illustrates several hydraulically powered well service tools in which the hydraulic conduit circulation is controlled by discretely placed magnet windings.

FIG. 4 illustrates a disappearing plug embodiment of the invention wherein the plug tool body 100 includes a channeled insert 102 that encompasses a fluid flow bore 101. The channeled insert includes a magnet winding 103 integrated therein. The plug 104 comprises an outer membrane skin 106 of polymer or thin, malleable metal. The membrane 106 encapsulates a body of controllable fluid 108. The plug 104 is positioned in the channel 102 while in the de-energized plastic state. When positioned, the magnet winding is energized to rigidify the controllable fluid 108 and hence, secure the plug at a fluid flow blocking position. At a subsequent moment when it is desired to open the flow bore 101, the winding 103 is de-energized. When the magnetic field is removed from the controllable fluid, the plug rigidity sags to facilitate removal of the plug from the bore 101. Although the plug remains within the fluid flow conduit, the loose, malleable nature of the de-energized may be easily accommodate by shunting or purging.

Figure 5:
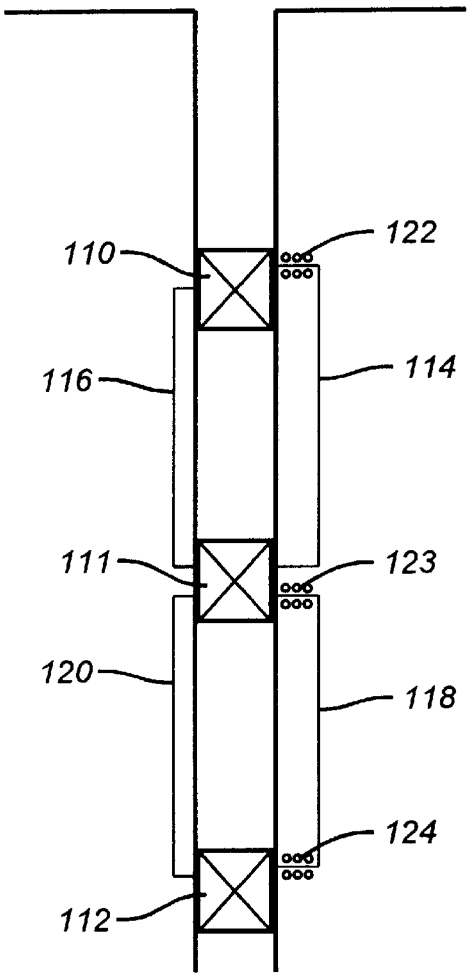

The invention embodiment of FIG. 5 represents a series of hydraulically powered well service tools 110, 111 and 112. The power fluid pumped within the fluid circulation lines 114, 116, 118 and 120 is a controllable fluid. Magnet windings 122, 123 and 124 are selectively positioned around the non-magnetic fluid circulation lines. When a winding is energized, the controllable fluid within the associated conduit congeals in the proximity of the winding to block fluid flow within the conduit. Thus, by selectively energizing any one or more of the windings 122, 123 or 124, the fluid flow route through the conduits may be selectively directed or stopped.

Although the invention has been described in terms of specified embodiments which are set forth in detail, it should be understood that the description is for illustration only and that the invention is not necessarily limited thereto, since alternative embodiments and operating techniques will become apparent to those of ordinary skill in the art in view of the disclosure. Accordingly, modifications are contemplated which can be made without departing from the spirit of the described and claimed invention.

What is claimed is:

1. A downhole wellbore tool having an actuating element disposed for positional translation from one of opposing pressure zones, said one pressure zone comprising a selectively engaged electromagnetic field source and confining a fluid having electroactive rheological properties whereby energizing said field source restrains translation of said actuating element.

2. A downhole wellbore tool as described by claim 1 wherein said actuating element is a slip engagement piston.

3. A downhole wellbore tool as described by claim 1 wherein said actuating element operates a valve element.

4. A downhole wellbore tool as described by claim 1 wherein another of said opposing pressure zones is biased by in situ wellbore pressure.

5. A downhole wellbore tool as described by claim 4 wherein said valve element is flapper element.

6. A downhole wellbore tool as described by claim 1 wherein said actuating element obstructs the operation of a valve element.

7. A downhole wellbore tool as described by claim 6 wherein said actuating element drives a sliding bore sleeve.

8. A downhole wellbore tool as described by claim 7 wherein said sliding bore sleeve obstructs the operation of a valve flapper element.

9. A fluid flow valve comprising a pivotable flapper element for selectively obstructing fluid flow through a flow channel within a valve body, a piston element for turning said flapper in a first direction about a pivot axis under the bias of a resilient element, said piston being operative within a chamber that is charged with controllable fluid, an electromagnet winding proximate of said chamber and an electrical circuit for selectively energizing said electromagnet winding to modify the viscosity of said controllable fluid for accommodating displacement of said piston against said fluid under the bias of said resilient element.

10. A fluid flow valve comprising a pivotable flapper element for directionally controlling fluid flow through a flow channel within a valve body by rotating between first and second flow control positions, a selectively engaged blocking element for preventing rotational movement of said flapper element from a first position, said blocking element including a resilient bias thereon toward disengagement from said flapper element and a controllable fluid block opposing said resilient bias.

* * * * *